US006671752B1

(12) United States Patent
Rao et al.

(10) Patent No.: US 6,671,752 B1
(45) Date of Patent: Dec. 30, 2003

(54) METHOD AND APPARATUS FOR BUS OPTIMIZATION IN A PLB SYSTEM

(75) Inventors: Seetharam Gundu Rao, Bangalore (IN); Ashutosh Misra, Bangalore (IN); Soumya Banerjee, Ranchi (IN)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 09/649,743

(22) Filed: Aug. 28, 2000

(51) Int. Cl.[7] .................................................. G06F 1/00
(52) U.S. Cl. ........................ 710/52; 710/55; 710/309; 710/310
(58) Field of Search ................. 710/32–35, 20, 710/110, 305–309, 311, 312, 313, 314, 112, 52, 55, 310

(56) References Cited

U.S. PATENT DOCUMENTS

| 5,983,300 | A | * | 11/1999 | Kanekal | 710/110 |
| 6,047,336 | A | * | 4/2000 | Green, III et al. | 710/22 |
| 6,055,584 | A | * | 4/2000 | Bridges et al. | 710/27 |
| 6,081,860 | A | * | 6/2000 | Bridges et al. | 710/110 |
| 6,108,722 | A | * | 8/2000 | Troeller et al. | 710/26 |
| 6,167,475 | A | * | 12/2000 | Carr | 710/113 |
| 6,430,641 | B1 | * | 8/2002 | Hoffmann et al. | 710/240 |
| 6,513,089 | B1 | * | 1/2003 | Hoffmann et al. | 710/309 |

FOREIGN PATENT DOCUMENTS

| JP | 61-228549 | 4/1985 | G06F/13/00 |
| JP | 62-052656 | 9/1985 | G06F/13/38 |
| JP | 62-077666 | 9/1985 | G06F/13/38 |
| JP | 62-209656 | 3/1986 | G06F/13/38 |
| JP | 63-113750 | 10/1986 | G06F/13/38 |
| JP | 63-188258 | 1/1987 | G06F/13/38 |
| JP | 03-110655 | 9/1989 | G06F/13/36 |
| JP | 04-112350 | 9/1990 | G06F/13/38 |
| JP | 05-012199 | 7/1991 | G06F/13/38 |
| JP | 08-314851 | 5/1995 | G06F/13/362 |

* cited by examiner

Primary Examiner—Paul R. Myers
Assistant Examiner—Raymond N Phan
(74) Attorney, Agent, or Firm—Manny W. Schecter; T. Rao Coca; Anthony V. S. England

(57) ABSTRACT

A method, an apparatus, and a computer program product for optimising a bus in a Processor Local Bus (PLB) system are disclosed. A master engine performs a transfer transaction of N bytes of data on the bus of the PLB system. A type of read or write data transfer to be performed by the master engine is determined to optimize operation of the bus in response to a transfer request received asynchronously from a device coupled to the bus. This involves a request type determination function. Data is asynchronously transferred using a FIFO between the device and the bus dependent upon the determined type of transfer.

12 Claims, 13 Drawing Sheets

METHOD AND APPARATUS FOR BUS OPTIMIZATION IN A PLB SYSTEM

FIELD OF THE INVENTION

The present invention relates generally to system-on-a-chip (SOC) applications and more particularly to on-chip buses used in such SOC applications.

BACKGROUND

Recent advances in silicon densities allow for the integration of numerous functions onto a single silicon chip. With this increased density, peripheral devices formerly attached to a processor at the card level are integrated onto the same die as the processor. As a result, chip designers must address issues traditionally handled by system designers. This type of implementation of a complex circuit on a single die is referred to as a system-on-a-chip (SOC).

Typically, an SOC contains numerous functional blocks representing a large number of logic gates. Design of such a system is realised through a macro-based approach. Macro-based design facilitates logic entry and verification, as well as re-use of macros with particular functionality. A macro is a re-usable tested design available in a library in the form of a netlist. In applications ranging from generic serial ports to complex memory controllers and processor cores, each SOC uses a number of common macros. A core is a re-usable tested design in any hardware description language like VHDL or Verilog.

Many single-chip solutions used in such applications are designed as custom chips, each with its own internal architecture. Logical units within such a chip are often difficult to extract and re-use in different applications. As a result, the same function is re-designed many times from one application to another.

Thus, a need clearly exists for an improved architecture for devices interfacing to an on-chip bus used in such SOC implementations that is able to optimise bus usage in respect of read and write data transfers.

SUMMARY

In accordance with a first aspect of the invention, there is provided a method of optimising a bus in a Processor Local Bus (PLB) system. The method includes the steps of:
providing a master engine for performing a transfer transaction of N bytes of data on the bus of the PLB system;
determining a type of transfer to be performed by the master engine to optimize operation of the bus of the PLB system in response to a transfer request received asynchronously from a device coupled to the bus; and
transferring data asynchronously using a FIFO between the device and the bus of the PLB system dependent upon the determined type of transfer.

Preferably, the transfer request is for a read or write data transfer.

Preferably, the determining step utilizes a request type determination function:

Opt_req(t) f(c1c2, S_FIFO, arb, thr_fifo)+g(wait_AAck, wait_DAck)+h(t, latmr, xfer_cnt, cnt_fifo, pend_req, pend_pri), where f( ) is a function of:
c1c2=a clock frequency ratio between PLB clock c1 and device clock c2,
S_FIFO=size of FIFO used for asynchronous interface,
arb=PLB arbitration type, single or two cycle,
thr_fifo=threshold of FIFO;
g( ) is a function of slave address acknowledgment wait state wait_AAck and slave data acknowledgment wait state wait_Dack;
h( ) is a function of:
t=time,
latmr=PLB master's latency timer count value at time t,
xfer_cnt=number of data transfers remaining at time t, to complete the device requested number of transfers,
cnt_fifo=occupancy of FIFO at time t,
pend_req=pending request at time t, and
pend_pri=pending request priority at time t.

Preferably, the method further includes the step of generating a transfer request. The generating step may include the steps of: checking a transfer count indicating the number of transfers remaining; checking a fifo count indicating the number of entries in the FIFO occupied by valid data; determining the next request type from the group consisting of word, sequential burst, fixed length burst and line transfer based on the transfer count and fifo count checks; and sending the transfer request. Alternatively, the method further includes the steps of: once the transfer request is sent, putting the next request on the bus of the PLB system; and based on a previous request type and the transfer count, determining a request type.

In accordance with a second aspect of the invention, there is provided an apparatus for optimising a bus in a Processor Local Bus (PLB) system. The apparatus includes:
a master engine for performing a transfer transaction of N bytes of data on the bus of the PLB system;
a device for determining a type of transfer to be performed by the master engine to optimize operation of the bus of the PLB system in response to a transfer request received asynchronously from a device coupled to the bus;
a FIFO coupled to the master engine for transferring data asynchronously between a device and the bus of the PLB system dependent upon the determined type of transfer.

In accordance with a third aspect of the invention, there is provided a computer program product having a computer readable medium having a computer program recorded therein for optimising a bus in a Processor Local Bus (PLB) system. The apparatus includes:
a computer program code module for providing a master engine for performing a transfer transaction of N bytes of data on the bus of the PLB system;
a computer program code module for determining a type of transfer to be performed by the master engine to optimize operation of the bus of the PLB system in response to a transfer request received asynchronously from a device coupled to the bus;
a computer program code module for transferring data asynchronously using a FIFO between the device and the bus of the PLB system dependent upon the determined type of transfer.

BRIEF DESCRIPTION OF THE DRAWINGS

Embodiments of the invention are described hereinafter with reference to the drawings, in which.

DETAILED DESCRIPTION

A method, an apparatus and a computer program product for optimising a bus in a Processor Local Bus (PLB) system are described. In the following description, numerous details are set forth. It will be apparent to one skilled in the art, however, that the present invention may be practised without these specific details. In other instances, well-known features are not described in detail so as not to obscure the present invention.

1. Overview of PLB System

A typical processor local bus (PLB) system consists of a processor core, system memory and devices connected to the bus which interact with the system memory. A device on the bus requests the bus through its PLB master, based on the transactions required. The PLB arbiter arbitrates the requests from all the masters requesting the bus. Hence at any given time, any master can request the PLB. From the PLB master's point of view, the number of requests and the duration of having access to the bus should be minimal, to have good bus utilisation on the system.

The embodiments of the invention are generally directed to on-chip buses used in SOC designs. Common buses are used for inter-macro communications, so as to promote re-use of logical units in such an SOC application by ensuring macro inter-connectivity. To this end, three buses are utilised for inter-connecting cores, library macros, and custom logic. Those buses include a processor local bus (PLB), an on-chip peripheral bus (OPB), and a device control register (DCR) bus.

The processor local bus (PLB) is a high performance, on-chip bus used in many system on chip (SOC) applications. The PLB consists of a PLB core (arbiter, control and gating logic) to which masters and slaves are attached. The PLB architecture supports up to 16 masters. Depending on the complexity of a particular system, the PLB core is designed or chosen from standard libraries. Generally, the PLB cores provided in the standard libraries support 4/8 masters or up to 16 masters. A master can perform read and write operations at the same time after doing address pipelining, because the PLB architecture has separate read and write buses. However, the PLB architecture cannot initiate requests for both a read and a write at the same time. In a given system on chip (SOC) application, PLB bus utilization can be improved using the overlapped read and write transfer feature of the PLB architecture.

Figure 1:
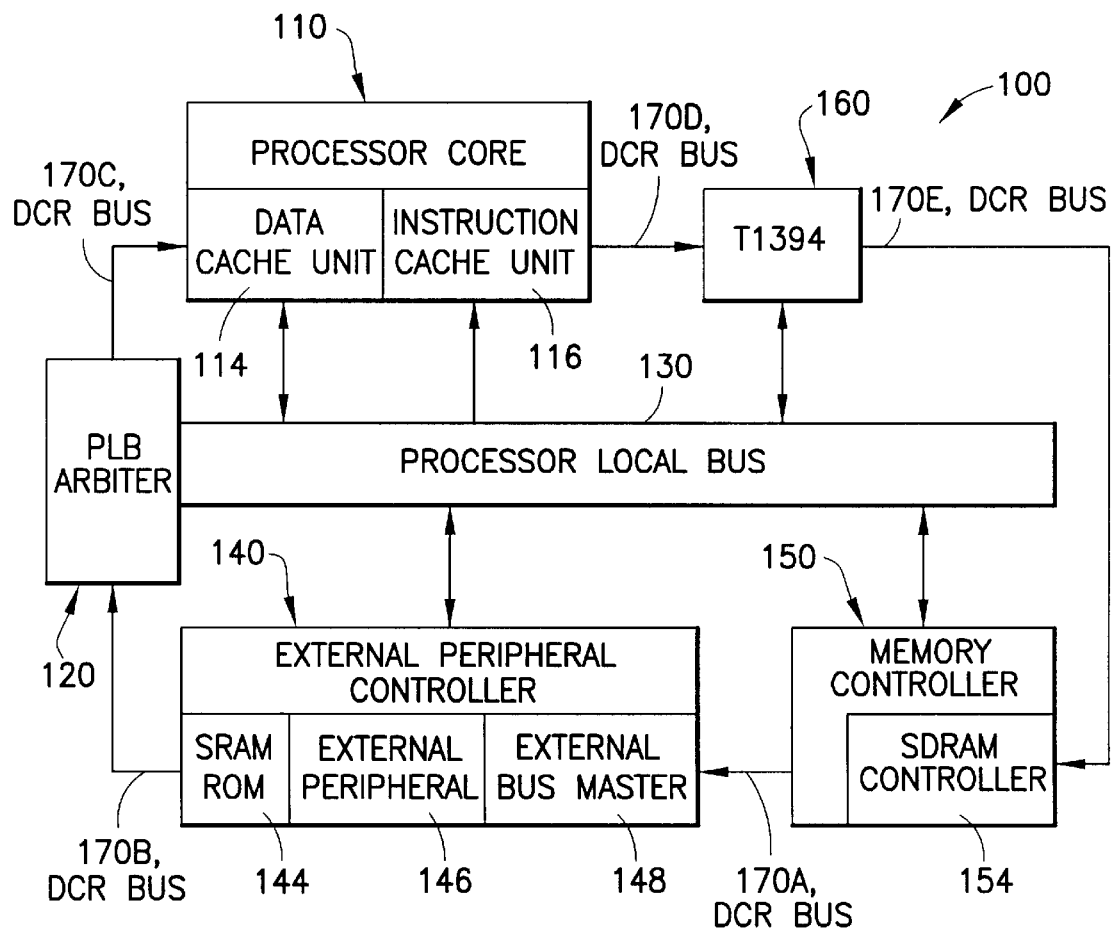
FIG. 1 is a block diagram of a portion of a system-on-a-chip (SOC) having a processor local bus (PLB) architecture, with which the embodiments of the invention can be practiced.

FIG. 1 is a block diagram illustrating an implementation of the PLB system 100 with which embodiments of the invention can be practiced. The system 100 includes a processor local bus 130, a processor core 110, a PLB arbiter 120, an external peripheral controller 140, and a memory controller 150. Also, the system 100 has a 1394a Link layer Controller 160, which is bi-directionally coupled to the PLB 130.

The PLB arbiter 120 is directly coupled to the processor local bus 130. The processor core 110 also includes a data cache unit 114 and an instruction cache unit 116. The data cache unit 114 performs read and write operations on the PLB 130 and is therefore bi-directionally coupled with the processor local bus 130, as indicated by the double headed arrow between the two. The instruction cache unit 116 only performs reads from memory, so the unit 116 requests read transfers only. The unit 116 is therefore uni-directionally coupled to the processor local bus 130, as indicated by the single headed arrow extending from the processor local bus 130 to the instruction cache unit 116.

The external peripheral controller 140 is bi-directionally coupled with the processor local bus 130, as indicated by the double headed arrow extending between the two. This controller 140 includes an SRAM/ROM 144, an external peripheral 146, and an external bus master 148.

The memory controller 150 is also bi-directionally coupled to the processor local bus 130, as indicated by the double headed arrow extending between the two. The memory controller 150 includes an SDRAM controller 154.

The memory controller 150, the external peripheral controller 140, the PLB arbiter 120, the processor core 110, and the T1394 link controller 160 are also interconnected by means of a ring-like device control register (DCR) bus 170. For example, the DCR bus 170C extends between the PLB arbiter 120 and the processor core 110, as indicated by a single headed arrow extending from the PLB arbiter 120 to the processor core 110. In a similar manner the DCR bus 170A extends from the memory controller 150 to the external peripheral controller 140, and in turn 170B from the latter 140 to the PLB arbiter 120. This DCR Loop 170 is completed with bus segments 170D–170E for the 1394 Link Layer Controller 162 and the memory controller 150.

2. A PLB Master

Figure 2:
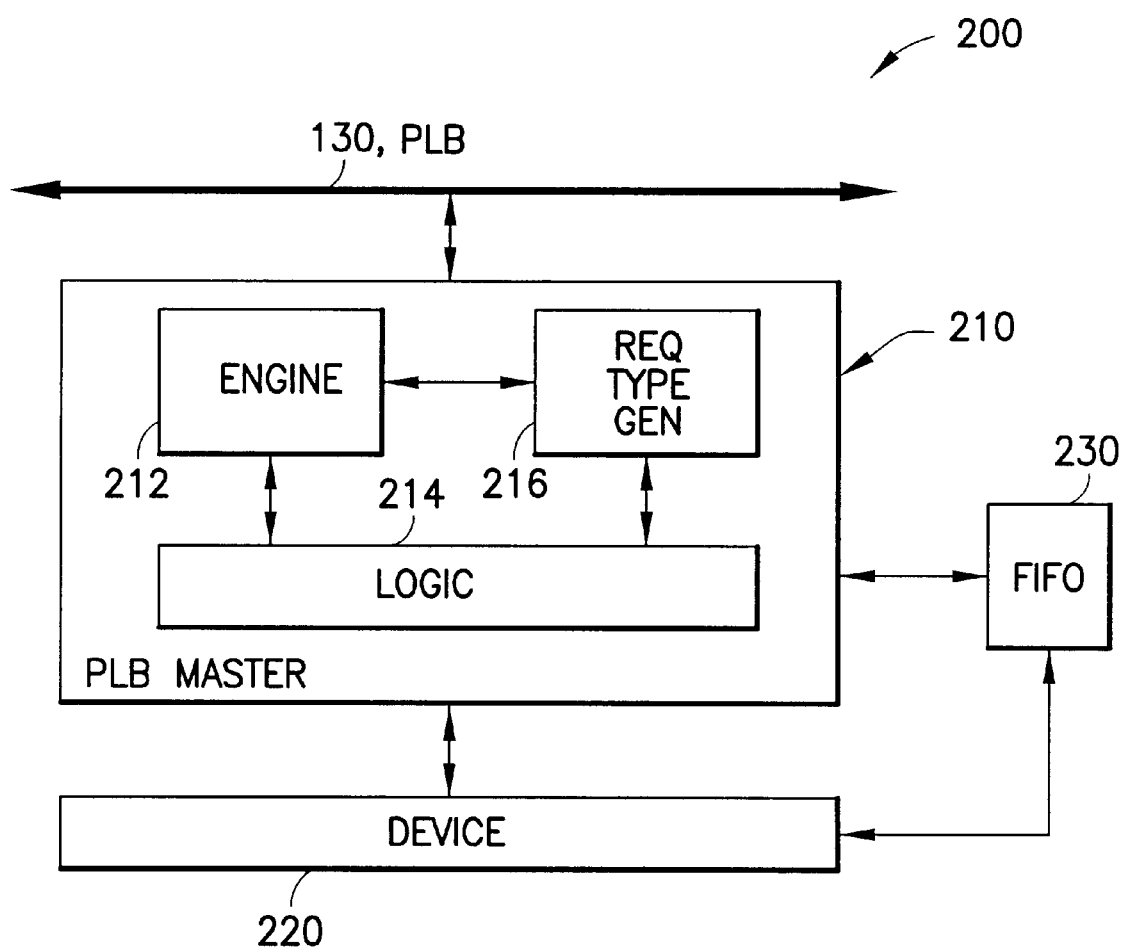
FIG. 2 is a block diagram of PLB master interfacing asynchronously with a device in accordance with the embodiments of the invention.

A PLB master when requesting a transfer from a PLB slave specifies the type of transfer being requested. The requested type of transfer should be supported by the PLB slave. FIG. 2 is a block diagram of a typical PLB master 210 interfacing to a device 220 asynchronously. The system 200 includes the PLB 130, the PLB master 210, the device 220, and a FIFO 230. The PLB master 210 is bi-directionally coupled with the PLB 130. The PLB master 210 includes an engine 212 and a request type generator module 216, both of which are bi-directionally inter-coupled. The PLB master 210 also includes a logic module 214, which is bi-directionally coupled with each of the engine 212 and the request type generator module 216. The device 220 is bi-directionally coupled with the PLB master 210 and is also bi-directionally coupled with the FIFO 230. In turn, the FIFO 230 is bi-directionally coupled with the PLB master 210.

The FIFO 230 transfers data between the asynchronous interface and the PLB 130. The main modules of the PLB master 210 are:
 a) the Master Engine 212 which does all the transactions of PLB 130, as per PLB protocol,
 b) the Req_Type_Gen module 216 which determines the type of transfer that the Engine 212 should do on the PLB 130 to optimize the bus, and
 c) the Logic module 214 which has all the other logic of the PLB master 210.

A transaction on the PLB 130 is initiated by a transaction request from the device 220 on the asynchronous interface.

The request may be either a read or a write transfer. The PLB master 210 processes the device request by determining the transaction type that needs to be requested on PLB 130. The transaction type requested on PLB 130 is determined by Req_Type generating module 216.

For optimal utilization of the PLB 130, the master 210 holds the bus 130 for the least number of cycles for transferring its data. Since the master 210 is addressing a slave on the PLB for its data transfer, the number of clock cycles required for data transfer on the PLB 130 is dependent on the characteristics of the slave being addressed to be the master. Hence, the master 210 tries to put requests on the PLB 130 in such a way that the PLB usage is optimal, and other masters also get access to the bus 130.

The data transfer across the asynchronous domain is through the use of the FIFO 230. In the case of a read transfer request from the device 220, the data is filled into the FIFO 230 from the PLB 130 and read by the device 220. In the case of a write transfer, the data to be transferred is filled into the FIFO 230 by the device 220 and read by the PLB master 210. Hence, at any time during a PLB transfer on the bus 130, the number of entries in the FIFO 230 is changing dynamically, as the rate of consumption of the data from the FIFO 230 is different from the rate of production of the data into the FIFO 230 because of different clock domains.

Given that N bytes of data are to be transferred from the device 220 to a memory location on the PLB (PLB slave), the embodiments of the invention determine the sequence, type and timing of transfers on the PLB 130 such that least number of clock cycles are used on the PLB 130. The data transfers requested from the device 220 may be a read or a write data transfer.

3. Request Type Determination Function

For optimal bus utilization on the PLB 130, various parameters are to be considered for generating a request type. The request type determination function at time t according to a first embodiment of the invention is:

$$Opt\_req(t)\; f(c1c2, S\_FIFO, arb, thr\_fifo) + g(wait\_AAck, wait\_DAck) + h(t, latmr, xfer\_cnt, cnt\_fifo, pend\_req, pend\_pri), \quad (1)$$

where
  f is a function of c1c2, S_FIFO, arb, thr_fifo:
    c1c2=a clock frequency ratio between the PLB clock c1 and the device clock c2,
    S_FIFO=the size of the FIFO used for the asynchronous interface,
    arb=PLB arbitration type, single or two cycle, and
    thr_fifo=threshold of the FIFO;
  g is a function of the slave address acknowledgment wait state wait_AAck and the slave data acknowledgment wait state wait_Dack; and
  h is a function of:
    t=time,
    latmr=PLB master's latency timer count value at time t,
    xfer_cnt=the number of data transfers remaining at time t, to complete the device requested number of transfers,
    cnt_fifo=occupancy of the FIFO at time t,
    pend_req=pending request at time t, and
    pend_pri=pending request priority at time t.

Regarding the threshold of FIFO, the Req_Type_Gen module 216 of FIG. 2 uses the number of entries in the FIFO 230 as a parameter for putting in a new request. The threshold of the FIFO 230 is the minimum number of entries of the FIFO 230, beyond which the Req_Type_Gen module 216 puts a request to Engine. If the number of entries in the FIFO 230 has not reached the threshold value, the Req_Type_Gen module 216 waits for the entries to reach the threshold value to put a request to the Engine module 212.

The PLB Architecture supports address pipe lining and a master can utilize this feature if the slave the master is addressing also supports address pipe lining.

In a particular PLB system, function f is a constant. For a PLB master addressing a particular slave in a PLB system, function g is a constant. h(t) is a function which is dynamically changing with respect to time t. Hence, taking these functions into consideration, the request generation should be such that utilization on PLB is optimal.

Considering the functions f, g and h separately, f(c1c2, S_FIFO, arb, thr_fifo):
Since c1c2, S_FIFO and arb are a constant, the only parameter which can be modified for optimization in this function is threshold value of FIFO for performing bursts, thr_fifo.

g(wait_AAck, wait_DAck):
This function is dependent on the PLB slave being addressed by the PLB master. The PLB master can average this function over time to acquire intelligence on the PLB slave being addressed. This information can be used by the PLB master to make requests for optimal performance.

h(t, latmr, xfer_cnt, cnt_fifo, pend_req, pend_pri):
This is a function of time t, and hence the value is dynamic. At any given time t, the PLB master has to consider the values of all the parameters of this function for determining the new request type. Each of these parameters is explained in detail hereinafter.

latmr
This is the latency timer value at time t. Any master which supports burst transfers on the PLB 130 is expected to maintain a latency count register value to limit occupancy of the bus 130. The latency count register is preferably a 10 bit register, with the upper 6 bits being programmable by software. Hence, the value at time t is the number of clocks cycles that the PLB master can have grant of the bus if the bus is owned by itself.

xfer_cnt
The value of this at time t gives the number of transfers remaining to complete the requested session by the device 220. If the value of this is zero, the value implies that the session requested by device is completed.

cnt_fifo
The FIFO 230 is used to transfer data between the two clock domains in the system: PLB clock domain and device clock domain. In case of a write transfer request from the device 220, data is put into FIFO 230 by the device 220 and read by the PLB master 210 for transferring the data on the PLB 130. In case of a read transfer request from the device 220, data is put into the FIFO 230 by the PLB master 210 after data is read from a PLB slave, and data is read from the FIFO 230 by the device 220. cnt_fifo gives the number of entries of the FIFO 230 occupied by valid data at any time t. This value needs to be used appropriately by the PLB-master 210 depending on a read or write transfer.

pend_req: Any pending request on the bus 130 at time t is specified by this variable.

pend_pri: This is the priority of the master having a request that is pending at time t.

The process of generating read and write requests is outlined in Table 1.

TABLE 1

1. Check the transfer count, xfer_cnt.
2. Check the cnt_fifo, which determines the occupancy of the FIFO 230 at the sampled time.
3. Based on these checks, determine the next request type, which may be word, sequential burst, fixed length burst, or line transfer.
4. Once the request has been sent, the next request may also be put on the bus as the PLB 130 supports pipe lining.
5. Based on the previous request type and xfer_cnt, determine the present request type to make full use of address pipe lining.

4. Read Transfer Process

FIG. 3 is a flow diagram illustrating a process 300 for putting a read request on the bus 130 when the device 220 has requested read transfers, based on the above mentioned parameters. This process has been implemented in PLB-Mast master 610 of FIG. 6. Table 2 contains definitions of the notation used in FIGS. 3A–3J.

TABLE 2

| | |
|---|---|
| R=> | Request has been made (session is pending); device 220 is requesting a write transaction session on the PLB 130 |
| X=> | Transfer count remaining (transfer count requested by the device 230 – number of transfers already requested), xfer_cnt of Equation (1) |
| F=> | Number of free entries in the FIFO 230, (Fff0 size – V) |
| S=> | Stop session requested by the device 220 during abnormal termination |
| B=> | Burst acknowledged by the engine 212 |
| I=> | Engine 212 in idle state |
| L=> | 2nd last signal from the engine 212 indicating there is one more data acknowledgment to be received in the present PLB request session. This signal is asserted when the latency timer expires. |
| V=> | Number of valid entries in the FIFO 230, cnt_fifo in Equation (1) |
| D=> | Read data acknowledgment received from the addressed PLB slave |
| D=> | Algorithm Choice |
| XOR=> | Remaining number of transfers |
| FL_Burst=> | Fixed length burst |
| SQ_Burst=> | Sequential burst |

The method of FIG. 3 enables a choice to be made from two or more algorithms for doing a request. The parameter A=> "Algorithm choice" is used so that requests on the bus can be done in a number of ways. If there is more than one algorithm implemented for putting a request on bus, this parameter A provides programability for the user to choose one of the algorithms.

The read state machine of FIG. 3 has the following states (marked using Trapeziums in the Flowchart):

1. Idle State
2. Request State
3. FL Burst ack State
4. SQ Burst ack State
5. FL Burst wait State
6. SQ Burst wait State
7. Wait for Idle State
8. Check Burst dack State Here FL stands for Fixed Length and SQ stands for Sequential.

Major considerations

While a read operation is being carried out, a request for transferring data is made based on many different conditions. If there is a large chunk of data to be transferred, there are different ways to transfer the chunk of data. To transfer a part of, or the whole of the data, a request has to be generated. This is done in the request state. Many different kinds of requests can be generated. As data is temporarily stored in a FIFO, it must be determined if the FIFO 230 is full or empty, or how many locations in the FIFO are empty. The process of FIG. 3 uses pipelining. So it must also be known if there is anything that is being moved in or out of the FIFO 230 till the time a request is executed (as previous requests may still be pending or being carried out). Also the device 220 to which the data is being transferred to or transferred from may be slow or fast.

Idle State

In the Idle State, a check is made to determine if there is a session in progress or requested (R=1), and if another device has asked to stop the current session of data transfer (S=1) or all the data that had to be transferred in the current session has already been requested to be transferred (X=0). If this is true, the current session ends and the master 210 waits in the Idle State till another session starts.

If the above conditions are false, a check is made to determine if there is a session that is in progress or starting (R=1). There is space in the FIFO 230 to keep the data (F>0), if there is at least one data transfer remaining to be requested in the current session (X>0) and if the device 220 has not asked to stop the current session (S=0). If all these conditions are satisfied, then processing continues to the Request State in the next clock cycle, where the proper transfer request for data is made. If these conditions are not satisfied, the master waits in the Idle State.

Request State

If there is a session that is proceeding (R=1) and a device 220 has requested to stop the current session (S=1), after sending a signal to end transfers as soon as possible, the master 210 goes into the Wait for Idle State at the next clock.

If this is false, then the process decides whether to give more priority to transferring the data to be transferred or to let others have ample opportunity to use the bus so that traffic on the bus is greater (A=1). If others are given greater opportunity to access the bus seeking to maximise bus traffic (as read and write requests can simultaneously use the data busses), the master 210 waits till the remaining transfers that are pending (already requested but are yet to be carried out) become less than four (XOR<4) before generating the next request.

If the above conditions are false, a check is made to determine if there is a session that is in progress or starting (R=1), if there is space in the FIFO to keep the data (F>0), if there is at least one data transfer remaining to be requested in the current session (X>0) and if the device has not asked to stop the current session (S=0). If all these conditions are satisfied, the next request is generated for data transfer or the master 210 waits for another clock if a better request can be given then.

Otherwise, if there is a session that is in progress or starting (R=1) and if there is at least one data transfer remaining to be requested in the current session (X>0) and the device has not asked to stop the current session (S=0), the master 210 remains in the Request State in the next cycle. Otherwise if there is a session that is in progress or starting (R=1) and if there is at least no data transfer remaining to be requested in the current session (X=0) and the device has not asked to stop the current session (S=0), the Idle State is entered in the next clock. If none of the foregoing checks is satisfied, the session is aborted and the master 210 enters the Wait for Idle State.

Different kinds of requests can be generated in this state. If a line transfer request is generated, the next state is the Request State. Otherwise, if the entire data transfer required in this session by Fixed Length Burst (F>X) can be finished, the request is made and the FL Burst ack State is entered. If this is not possible, a prediction is made depending on the speed of the device if a Sequential Burst can completely transfer the whole of the remaining data of this session. If the transfer can be completed, the request is made and SQ Burst ack State is entered. If line transfers are not possible and a Fixed length Burst is possible, the request is made and FL Burst ack State is entered. Also the same is done if a Fixed Length Burst can finish all transfers in the current session (F>=X) even if the remaining transfers to be requested are less than the threshold (X>threshold). For a burst, at least 3 transfers need to be done (X>2). Otherwise, a word transfer is done if a better request cannot be generated in the future instead of a word transfer. In either case, the Request State is entered again at the next clock.

FL Burst ack State/SQ Burst ack State

After generating a Burst request, either Fixed length or Sequential, the master must wait to confirm from the Engine if this request is being executed. The confirmation (B=1) comes in the next clock for which the master waits in the FL Burst State in case of a Fixed length Burst request or in the SQ Burst State in case of a Sequential Burst request. Then, processing then enters the FL Burst wait State or the SQ Burst wait State respectively. If the confirmation does not arrive, the master 210 goes back to the Request State at the next clock to generate the next request.

FL Burst wait State/SQ Burst wait State

In both the FL Burst wait State and the SQ Burst wait State, a signal is obtained indicating that only 2 more transfers are left (L=1).

In the FL Burst wait State on receiving this signal, a check is made to determine if there is a session that is in progress or starting (R=1), if there is space in the FIFO to keep the data (F>0), if there is at least one data transfer remaining to be requested in the current session (X>0) and if the device has not asked to stop the current session (S=0). If all these conditions are satisfied, the Request State is entered in the next clock cycle where the proper transfer request for data is made. Otherwise the Check Burst dack state is entered. If this signal is not received and device has asked to stop the current session (S=1), after sending a signal to end transfers as soon as possible, the Wait for Idle State is entered at the next clock. Otherwise the master keeps on waiting in the FL Burst wait State.

In the SQ Burst wait State on receiving this signal, the Check Burst dack state is entered. If this signal is not received and the device has asked to stop the current session (S=1), or the FIFO is filling up (V>13), or if all transfers in the session are about to be completed (X<3), then after sending a signal end the Burst to end transfers as soon as possible, the Wait for Idle State is entered at the next clock. Otherwise the master keeps waiting in the SQ Burst wait State.

In the Check Burst dack State, confirmation is awaited that the last data transfer of the Burst transfer is over.

Check Burst dack State

If the device asks to stop the ongoing session (S=1) or all the data transfers of the current session are complete (X=0), then the Wait for Idle State is entered. In the Check Burst dack State, confirmation is awaited that the last data transfer of the Burst transfer is over (D=1). If this is so and more data has to be transferred in the current session, the Request State is entered. Otherwise, the Idle State is entered if only the Burst transfer is over (D=1). Otherwise the master remains in this state.

Wait for Idle State

In this state, the master 210 waits for all transfers and activities that are ongoing to cease. When all is over (I=0), the present ongoing session is ended and the Idle State is entered.

In the following drawings, the read transfer process is shown across a number of Figures. To show continuity, a step of one Figure is shown again in another Figure (e.g. step 320 appears in both FIGS. 3A and 3B).

Processing commences in step 310. The PLB master engine 212 enters an idle state in step 312. In decision block 314, a check is made to determine if R=1, and S=1/X=0. This step checks if a stop session has been requested by the device or the number of transfers requested by the device is zero. If decision block 314 returns true (Yes), processing continues at step 316. In step 316, the session is ended and processing continues at step 312. Otherwise, if decision block 314 returns false (No), processing continues at decision block 318. In decision block 318, a check is made to determine if X>0, F>0, R=1, and S=0. If decision block 318 returns false (No), processing continues at step 312 for the idle state. Otherwise, if decision block 318 returns true (Yes), processing continues at step 320. In step 320, the request state is entered (see FIG. 3B).

Figure 3A:
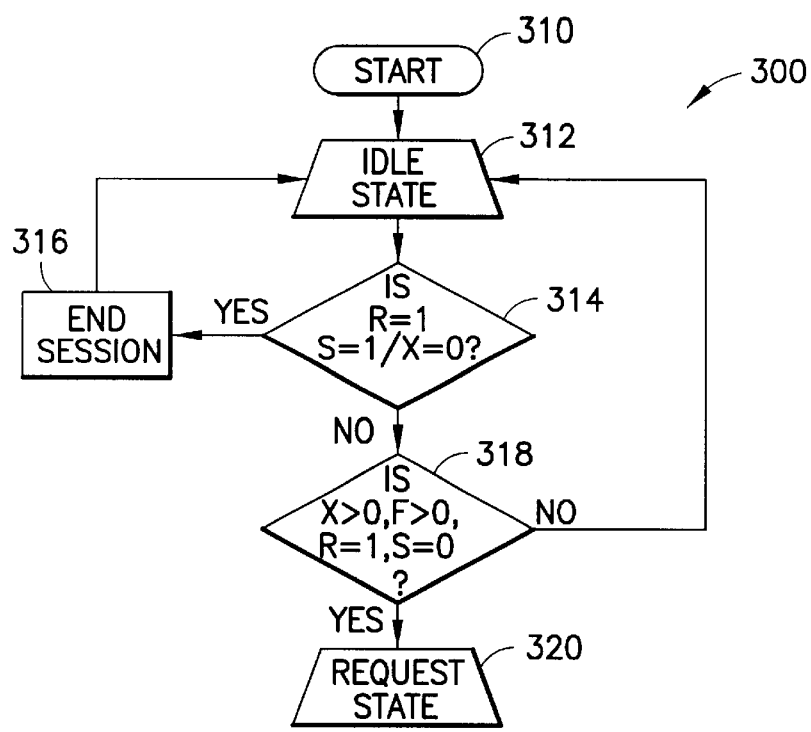
FIG. 3 is a flowchart illustrating the process of putting a read request on the bus of the PLB system when the device has requested read transfers in accordance with a first embodiment of the invention.

Processing continues in step 3B where the first step is again identified as the request state 320 of FIG. 3A. In decision block 322, a check is made to determine if S=1 and R=1. If decision block 322 returns true (Yes), processing continues at step 336, in which a wait for idle state is entered (see FIG. 3J described hereinafter). Otherwise, if decision block 322 returns false (No), processing continues at decision block 324.

In decision block 324, a check is made to determine if A=1 and XOR>3. In this embodiment, A is set equal to 1 by default. If decision block 324 returns true (Yes), processing continues at step 320. Otherwise, if decision block 324 returns false (No), processing continues at decision block 326. In decision block 326, a check is made to determine if X>0, F>0, R=1, and S=0. If decision block 326 returns true (Yes), processing continues at decision block 340 of FIG. 3C (described hereinafter). Otherwise, if decision block 326 returns false (No), processing continues at decision block 328. In decision block 328, a check is made to determine if S=0, R=1, and X>0. If decision block 328 returns true (Yes), processing continues at step 320. Otherwise, if decision block 328 returns false (No), processing continues at decision block 330. In decision block 330, a check is made to determine if S=0, R=1, and X=0. If decision block 330 returns true (Yes), processing continues at the idle state step 312 of FIG. 3A. Otherwise, if decision block 330 returns false (No), processing continues at step 334. In step 334, the current transfer is aborted. Processing then continues at step 336, in which the wait for idle state is entered (see FIG. 3J).

Figure 3B:
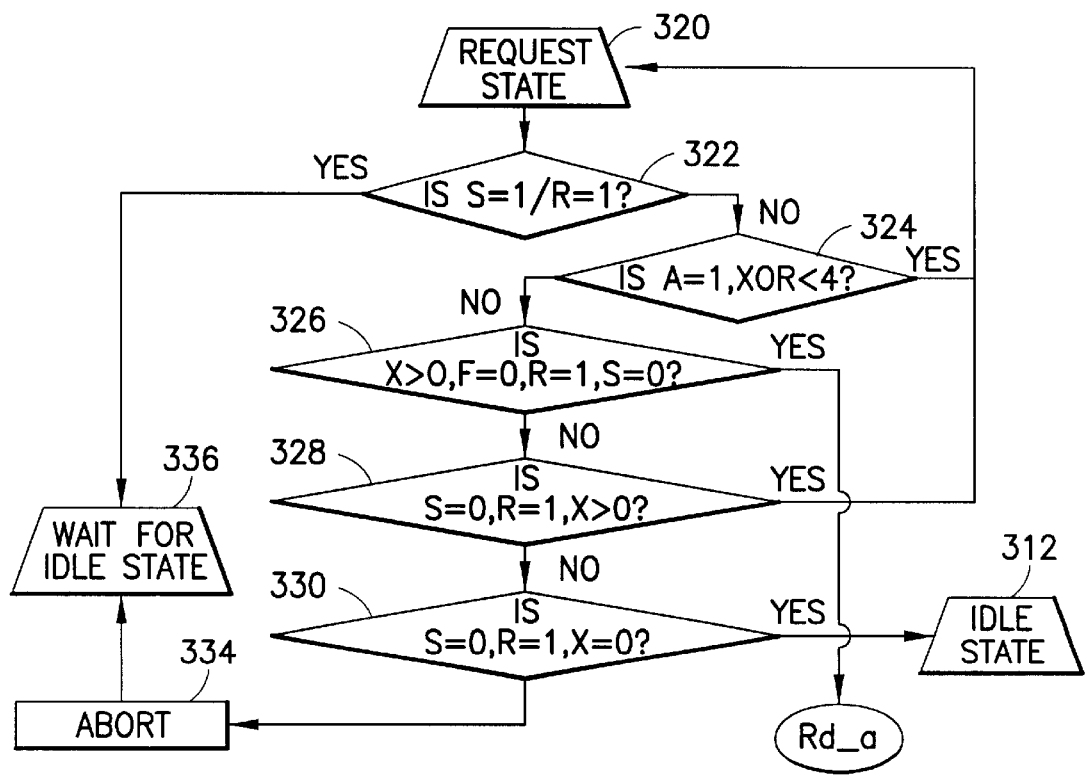
Figure 3C:
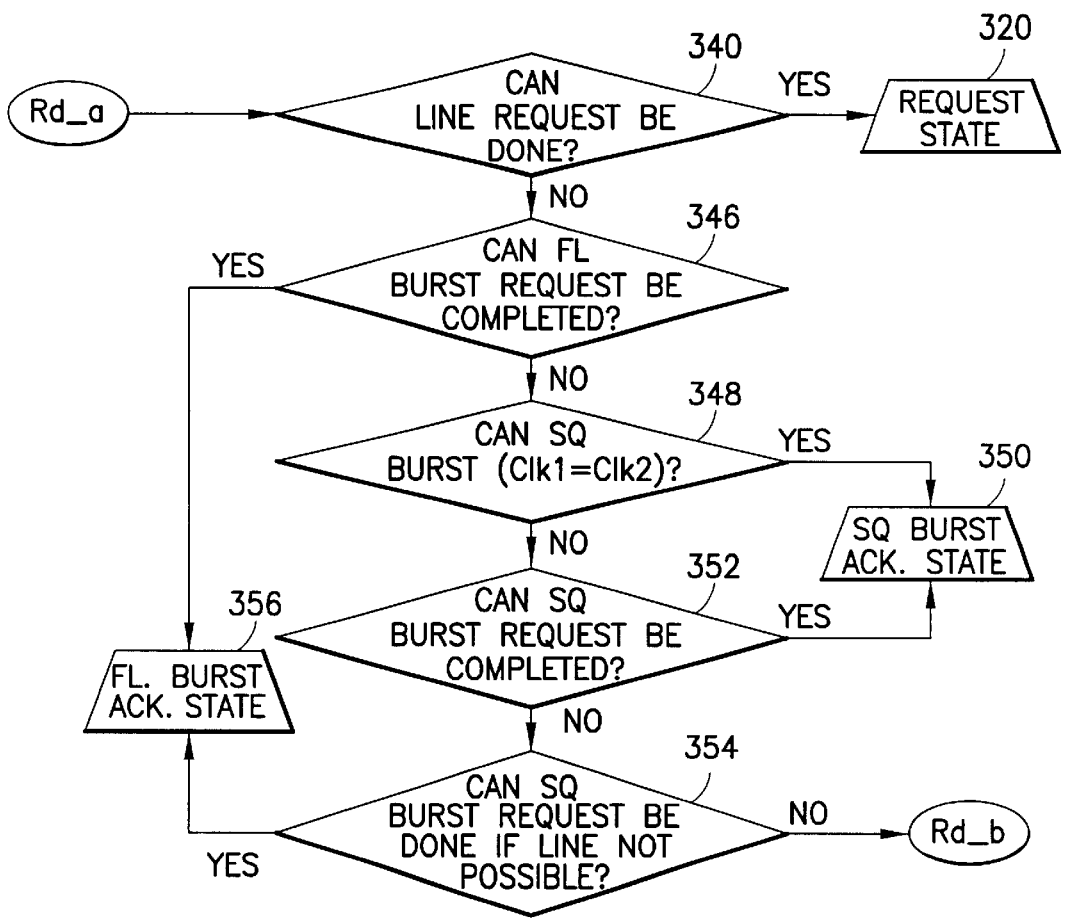

Referring again to decision block 326 of FIG. 3B, if decision block 326 returns true (Yes), processing continues at decision block 340 of FIG. 3C. In decision block 340, a check is made to determine if a line transfer request can be done. If decision block 340 returns true (Yes), processing continues at step 320 of FIGS. 3A and 3B. In step 320, a request state is entered. Otherwise, if decision block 340 returns false (No), processing continues at decision block 346. In decision block 346, a check is made to determine if a fixed length burst transfer request can be completed. If decision block 346 returns true (Yes), processing continues at step 356. In step 356, a fixed length burst acknowledgment state is entered (see FIG. 3E). Otherwise, if decision block 346 returns false (No), processing continues at decision block 348.

In decision block 348, a check is made to determine if a sequential burst can be completed (i.e., clock 1=clock 2). If decision block 348 returns true (Yes), processing continues at step 350. In step 350, a sequential burst acknowledgment state is entered (see FIG. 3F). Otherwise, if decision block 348 returns false (No), processing continues at decision block 352. In decision block 352, a check is made to determine if a sequential burst request can be completed. If decision block 352 returns true (Yes), processing continues at step 350. Otherwise, if decision block 352 returns false (No), processing continues at decision block 354. In decision block 354, a check is made to determine if a sequential burst request can be completed if a line transfer is not possible. If decision block 354 returns true (Yes), processing continues at step 356 (see FIG. 3E). Otherwise, if decision block 354 returns false (No), processing continues at decision block 360 of FIG. 3D.

Figure 3D:
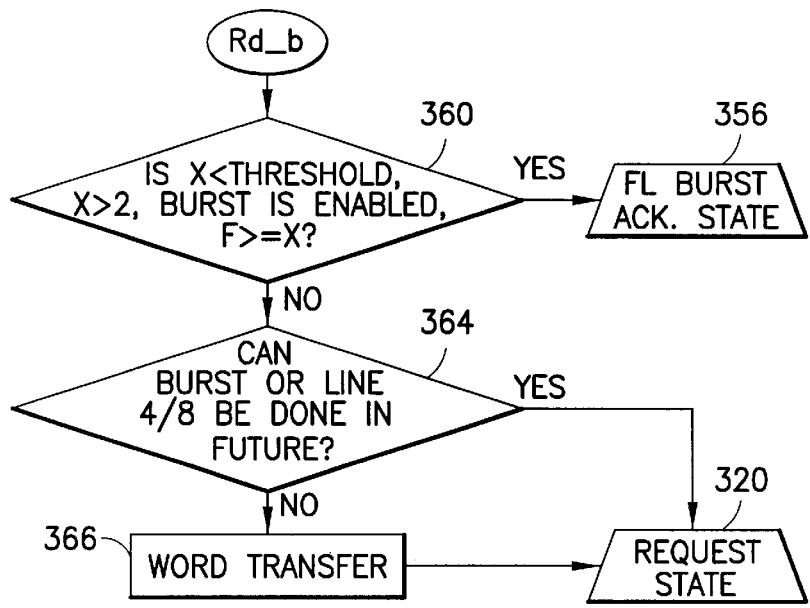

With reference to FIG. 3D, in decision block 360, a check is made to determine if X<threshold, X>2, burst transfer is enabled, and F>=X. If decision block 360 returns true (Yes), processing continues at step 356 (see FIG. 3E). Otherwise, if decision block 360 returns false (No), processing continues at decision block 364. In decision block 364, a check is made to determine if a burst or line 4/8 transfer can be done in the future. If decision block 364 returns true (Yes), processing continues at step 320, in which the request state is entered of FIG. 3A. Otherwise, if decision block 364 returns false (No), processing continues at step 366. In step 366, a one word transfer is carried out. Processing then continues at step 320.

Figure 3E:
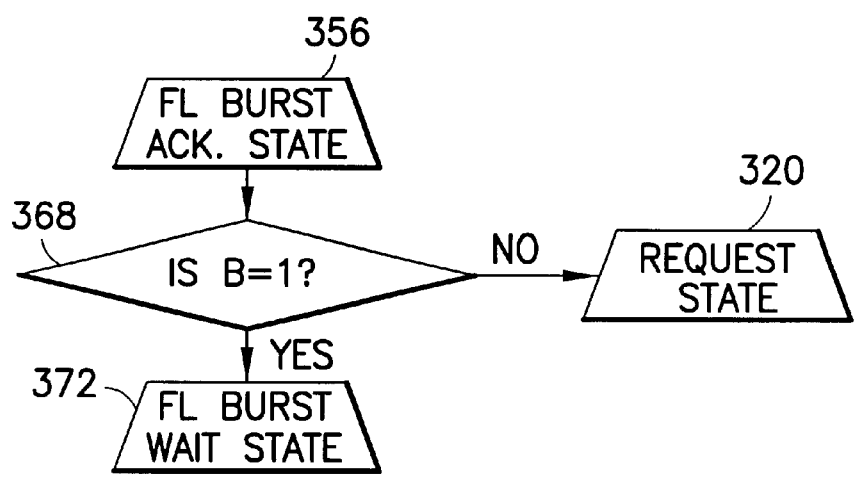

In step 356 of FIG. 3E, the fixed length burst acknowledgment state is entered. In step 368, a check is made to determine if B=1. If decision block 368 returns false (No), processing continues at step 320. Otherwise, if decision block 368 returns true (Yes), processing continues at step 372. In step 372, the fixed length burst wait state is entered.

Figure 3F:
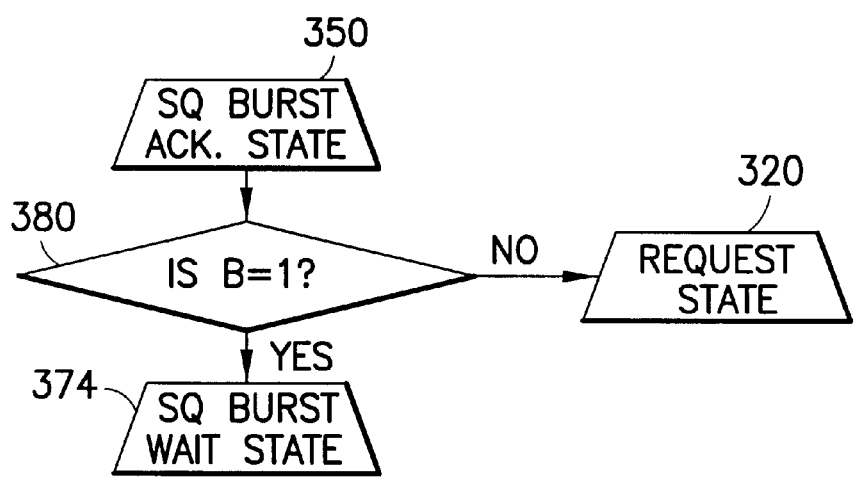

Referring again to FIG. 3C, if decision block 348 or 352 returns true (Yes), the sequential burst acknowledgment state 350 is entered, as shown in FIG. 3F. Processing then continues at decision block 380. In decision block 380, a check is made to determine if B=1. If decision block 380 returns false (No), processing continues at step 320. In step 320, the request state is entered. Otherwise, if decision block 380 returns true (Yes), processing continues at step 374. In step 374, the sequential burst wait state is entered (see FIG. 3H).

Figure 3G:
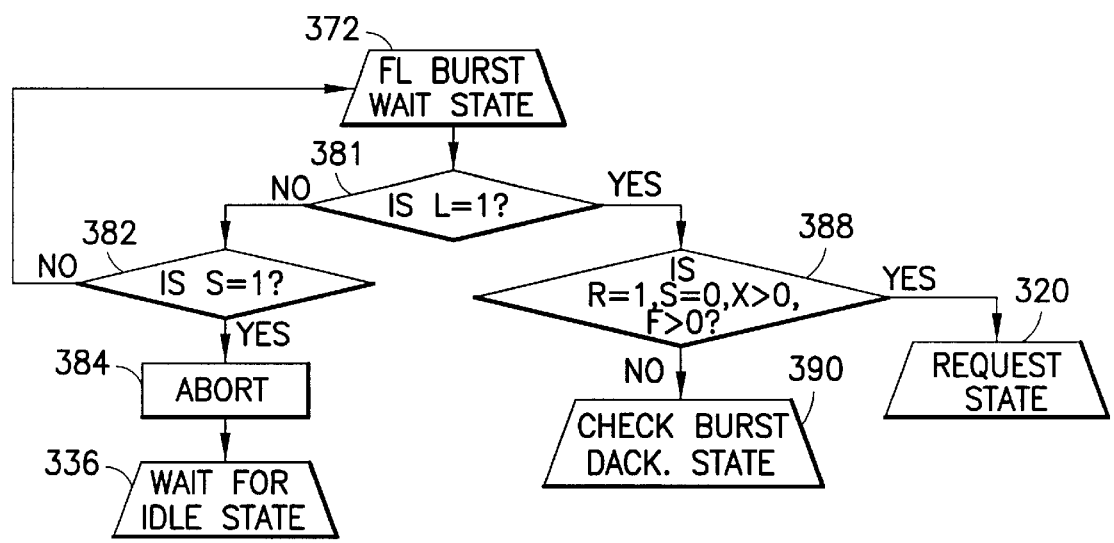

Referring to FIG. 3E, if decision block 368 returns true (Yes), processing continues at the fixed length burst wait state step 372. In FIG. 3G, from step 372, processing continues at decision block 381. In decision block 381, a check is made to determine if L=1. If decision block 381 returns false (No), processing continues at decision block 382. In decision block 382, a check is made to determine if S=1. If decision block 382 returns false (No), processing continues at step 372. Otherwise, if decision block 382 returns true (Yes), processing continues at step 384. In step 384, execution is aborted and in step 336 the wait for idle state is entered.

Otherwise, if decision block 381 returns true (Yes), processing continues at decision block 388. In decision block 388, a check is made to determine if R=1, S=0, X>0, and F>0. If decision block 388 returns true (Yes), processing continues in step 320. In step 320, a request state is entered. Otherwise, if decision block 388 returns false (No), processing continues in step 390. In step 390, the burst dack state is checked (see FIG. 3I).

From step 390, processing continues in decision block 392. In decision block 392, a check is made to determine if S=1 or X=0. If decision block 392 returns true (Yes), processing continues at step 336 and the wait for idle state is entered. Otherwise, if decision block 392 returns false (No), processing continues at decision block 394. In decision block 394, a check is made to determine if D=1 and X>0. If decision block 394 returns true (Yes), processing continues at step 320. In step 320, the request state is entered. Otherwise, if decision block 394 returns false (No), processing continues at decision block 396. In decision block 396, a check is made to determine if D=1. If decision block 396 returns true (Yes), processing continues at step 312 of FIG. A. In step 312, an idle state is entered. Otherwise, if decision block 396 returns false (No), processing continues at step 390.

Figure 3H:
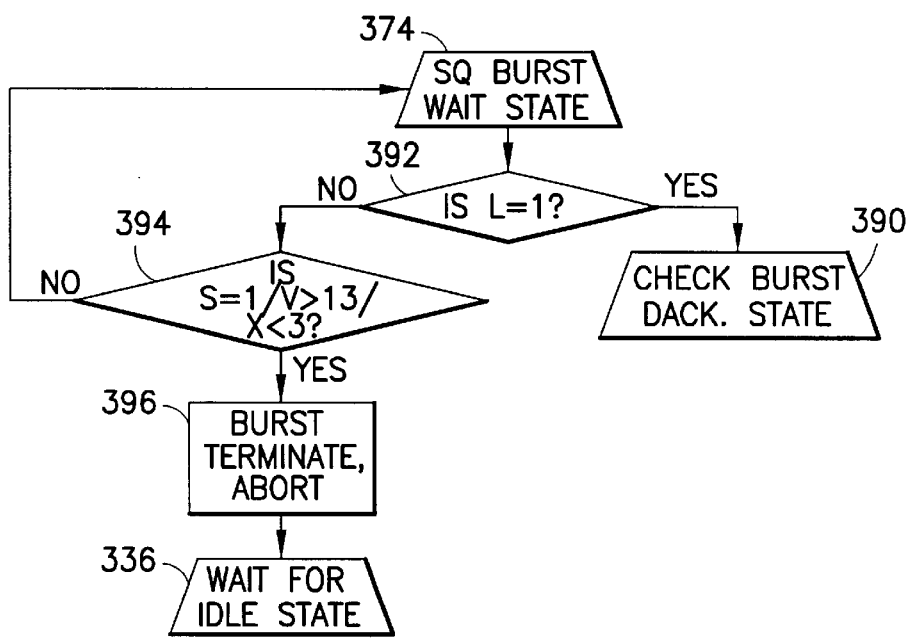

Processing from step 374 in FIG. 3F continues at decision block 392 of FIG. 3H. In decision block 392, a check is made to determine if L=1. If decision block 392 returns true (Yes), processing continues at step 390. In step 390, the burst dack state is checked (see FIG. 3I for continued processing).

Otherwise, if decision block 392 returns false (No), processing continues at decision block 394. In decision block 394, a check is made to determine if S=1, V>13, or X<3. If decision block 394 returns false (No), processing continues at step 374. Otherwise, if decision block 394 returns true (Yes), processing continues at step 396. In step 396 the burst transfer is terminated and processing aborts. Processing continues at step 336 in which a wait for idle state is entered.

Figure 3I:
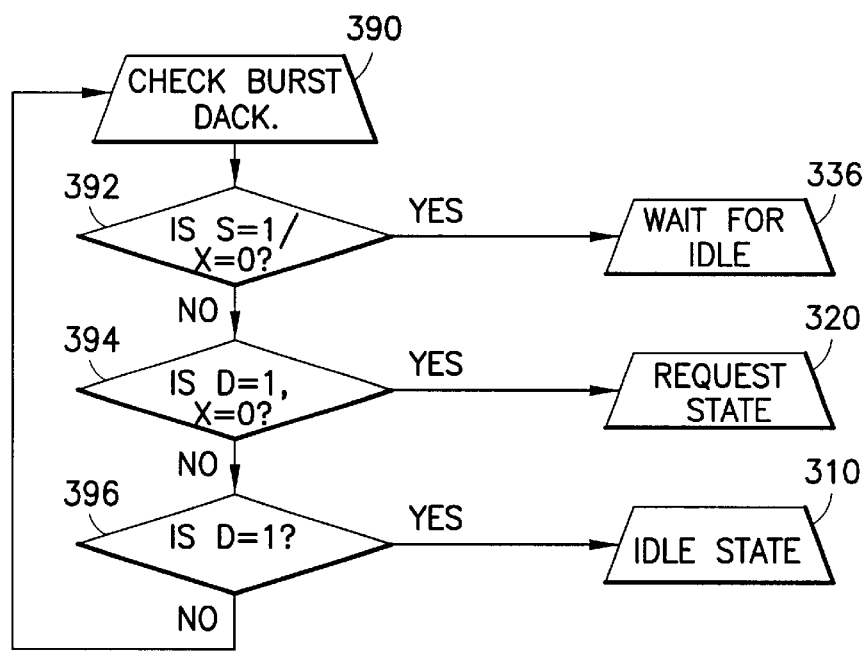

From step 390 of FIG. 3H, processing continues at decision block 392 of FIG. 3I. In decision block 392, a check is made to determine if S=1 and X=0. If decision block 392 returns true (Yes), processing continues at step 336 and a wait for idle state is entered. Otherwise, if decision block 392 returns false (No), processing continues at decision block 394.

In decision block 394, a check is made to determine if D=1 and X>0. If decision block 394 returns true (Yes), processing continues at step 320 and a request state is entered. Otherwise if decision block 394 returns false (No), processing continues at decision block 396.

In decision block 396, a check is made to determine if D=1. If decision block 396 returns true (Yes), processing continues at step 312 and an idle state is entered. Otherwise, if decision block 396 returns false (No), processing continues at step 390.

Figure 3J:
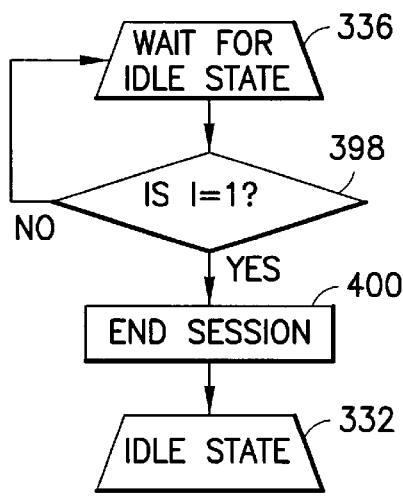

Referring to FIG. 3J, from the wait for idle state step 336, processing continues at decision block 398. In decision block 398, a check is made to determine if I=1. If decision block 398 returns false (No), processing continues at step 336. Otherwise, if decision block 398 returns true (Yes), processing continues at step 400. In step 400, the current session is ended. Processing then continues at step 332 and an idle state is entered.

5. Write Transfer Process

The write state machine of FIG. 4 has the following states (marked using Trapeziums in the Flowchart):

1. Idle State

2. Request State

3. FL Burst ack State

4. SQ Burst ack State

5. FL Burst wait State

6. SQ Burst wait State

7. First Request State

8. Check Burst dack State

FL stands for Fixed Length, and SQ stands for Sequential.

Idle State

In the Idle State, a check is first made to determine if there is a session in progress or requested (R=1), or if all the data that had to be transferred in the current session has already been requested to be transferred (XC=0). If this is true, the current session is ended and the master waits in the Idle State till another session starts.

If the above conditions are false, a check is made if there is a session that is in progress or starting (R=1), if all write transfers and activities have ceased (I=1) and if there is at least one data transfer remaining to be requested in the current session (XC>0). If all these conditions are satisfied, a check is made to determine if the whole word is to be transferred (FAA=1), the Request State is entered in the next clock cycle, where the proper request for transfer for data is made. Otherwise, the First Request state is entered.

But if these conditions are not satisfied, the master waits in the Idle State.

First Request State

In the First Request state, the word with appropriate signals that indicate which bytes of the word are to be transferred are sent and then the Request state is entered.

Request State

If there is a session that is proceeding (R=1) and if there is no data transfer remaining to be requested in the current session (XC=0), then after sending a signal to end the session, the Idle State is entered at the next clock.

If the above conditions are false, a check is made to determine if there is a session that is in progress or starting (R=1) and if there is at least one data transfer remaining to be requested in the current session (XC>0). If these are satisfied, then a check is made to determine if only one more data is to be sent in the current session (XC=1) and if the data is available in the FIFO (CNR=1), or if there is a termination of the session by means of a Tail bit signal (T=1). If these are true, the word with appropriate signals that indicate which bytes of the word are to be transferred is sent and the Request State is entered. Otherwise, attempts are made to generate other kinds of requests.

A burst can be requested only if the number of data entries in the FIFO is at least the same as a threshold, the FIFO threshold (CNR>=FTH). The only exception is when the whole session can be completed. Different kinds of requests can be generated in this state. If a line transfer request is generated, the next state is the Request State. Otherwise if all the data transfer required in this session can be finished off by a Fixed Length Burst (CNR=XC), the request is made and FL Burst ack State is entered. If this is not possible, an attempt is made to predict depending on the speed of the device (only if clock speed on both sides are the same) if a Sequential Burst can completely transfer the whole of the remaining data of this session. If the sequential burst can, then the request is made and SQ Burst ack State is entered. Otherwise if a Fixed length Burst is possible, this type of request is made and FL Burst ack State is entered. Then the master tries to do a Sequential Burst and go to SQ Burst ack State. If that is not possible, the master tries to send a request for a single word transfer only if other better kinds of requests are not possible in the future. Then Request State is entered at the next clock.

FL Burst ack State/SQ Burst ack State

After generating a Burst request, either Fixed length or Sequential, the master 210 must wait to confirm from the Engine if this request is being executed. The confirmation (B=1) comes in the next clock for which the master waits in the FL Burst State in case of a Fixed length Burst request or in the SQ Burst State in case of a Sequential Burst request. Then the FL Burst wait State or the SQ Burst wait State is entered respectively. If the confirmation does not arrive, the master returns to the Request State at the next clock to generate the next request.

Burst wait State/SQ Burst wait State

In both the FL Burst wait State and the SQ Burst wait State, a signal indicating that only 2 more transfers are left (L=1) is obtained.

In the FL Burst wait State on receiving this signal, the master enters the Check Burst dack state. Otherwise, the master keeps on waiting in the FL Burst wait State.

In the SQ Burst wait State, a check is made to determine if the FIFO is emptying (CNR=2). After sending a signal to end the Burst to end transfers as soon as possible, the Check Burst dack State is entered. If the signal (L=1) is obtained, the Check Burst dack State is entered. Otherwise the master keeps on waiting in the SQ Burst wait State.

In the Check Burst dack State, the master waits for the confirmation that the last data transfer of the Burst transfer is over.

Check Burst dack State

In the Check Burst dack State, the master 210 waits for the confirmation that the last data transfer of the Burst transfer is over (WD=1). If this is so, the Request State is entered. Otherwise the master remains in this state.

FIG. 4 is a flow chart illustrating a process 400 for putting a write request on bus when device has requested for write transfers, based on the above mentioned parameters. This process is implemented in the PLB-Mast master 610 of FIG. 6. Table 3 lists the definitions for the notations used in FIGS. 4A–4J.

TABLE 3

| | |
|---|---|
| R=> | Device requests for a write session on PLB |
| XC=> | Number of transfers remaining (Number of transfers requested by device – transfers already requested), xfer_cnt of eqn (1) |
| I=> | PLB Master Engine idle |
| FAA=> | First requested address is an aligned address |
| CNR=> | The number of data entries in FIFO for which request has not been made |
| T=> | Abnormal termination of a write transaction through a tail bit transaction |
| FTH=> | FIFO threshold for doing a burst transfer |
| B=> | PLB Master engine is in burst state, doing a burst transfer |
| L=> | 2nd Last signal from engine indicating there is one more data acknowledgment to be received in the present PLB request session. This signal is asserted when latency timer expires. |
| WD=> | Write data acknowledgment from PLB slave |
| FL=> | Fixed length burst transfer |
| SQ=> | Sequential Burst transfer |

Figure 4A:
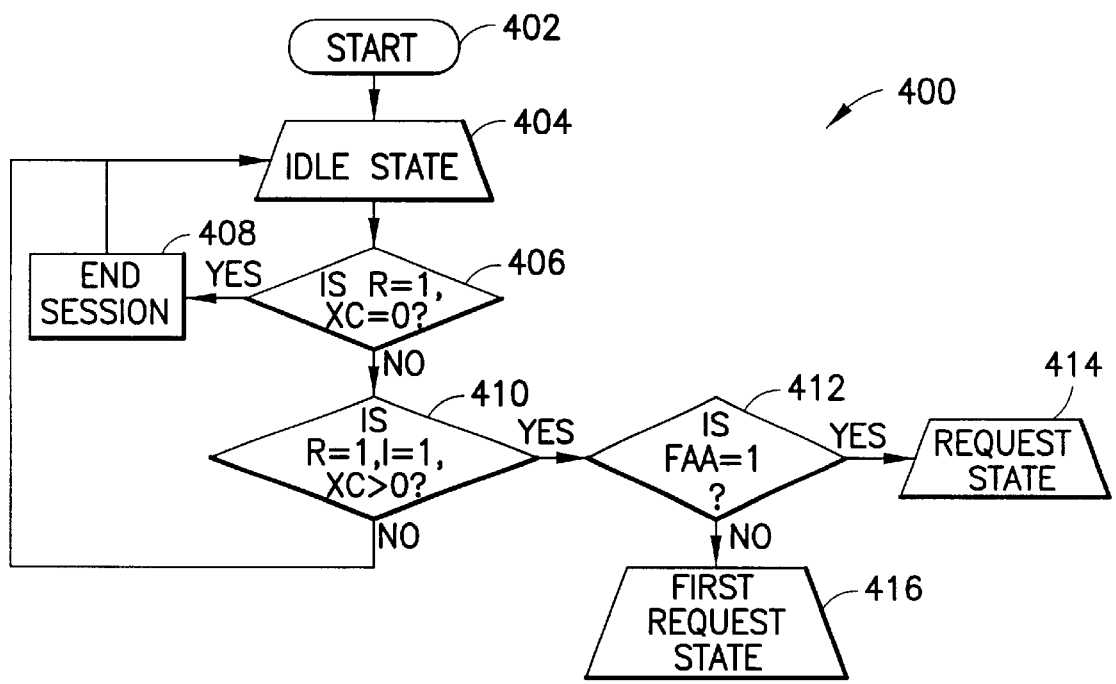
FIG. 4 is a flowchart illustrating the process of putting a write request on the bus of the PLB system when the device has requested write transfers in accordance with a first embodiment of the invention.

In FIG. 4A, processing commences in step 402. In step 404, an idle state is entered. In decision block 406, a check is made if R=1 and XC=0. If decision block 406 returns true (Yes), processing continues in step 408. In step 408 the current session is ended and processing continues at step 404. If the device needs to terminate the requested number of transfers prematurely or if the master completes transfer of requested number of data, the master sends an end_ session to the device. Otherwise, if decision block 406 returns false (No), processing continues at decision block 410. In decision block 410 a check is made to determine if R=1, I=1, and XC>0. If decision block 410 returns false (No), processing continues at step 404. Otherwise, if decision block 410 returns true (Yes), processing continues at decision block 412. In decision block 412, a check is made to determine if FAA=1. If decision block 412 returns false (No), processing continues at step 416. In step 416, a first request state is entered (see FIG. 4B). Otherwise, if decision block 412 returns true (Yes), processing continues at step 414. In step 414, a request state is entered (see FIG. 4C).

Figure 4B:
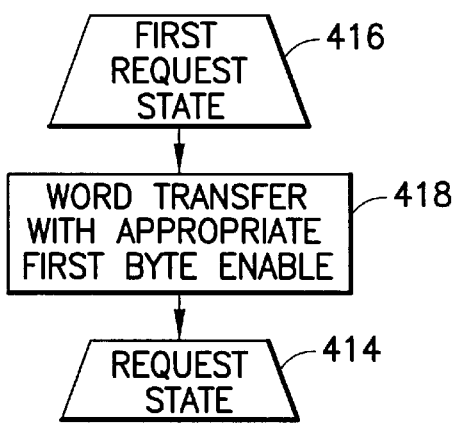

With regard to FIG. 4B, processing continues from step 416 to step 418. In step 418, a word transfer is carried out with appropriate first byte enabled. First byte enable is used to transfer the requested bytes of first word transaction on the PLB. Processing continues at step 414 (see FIG. 4C).

Figure 4C:
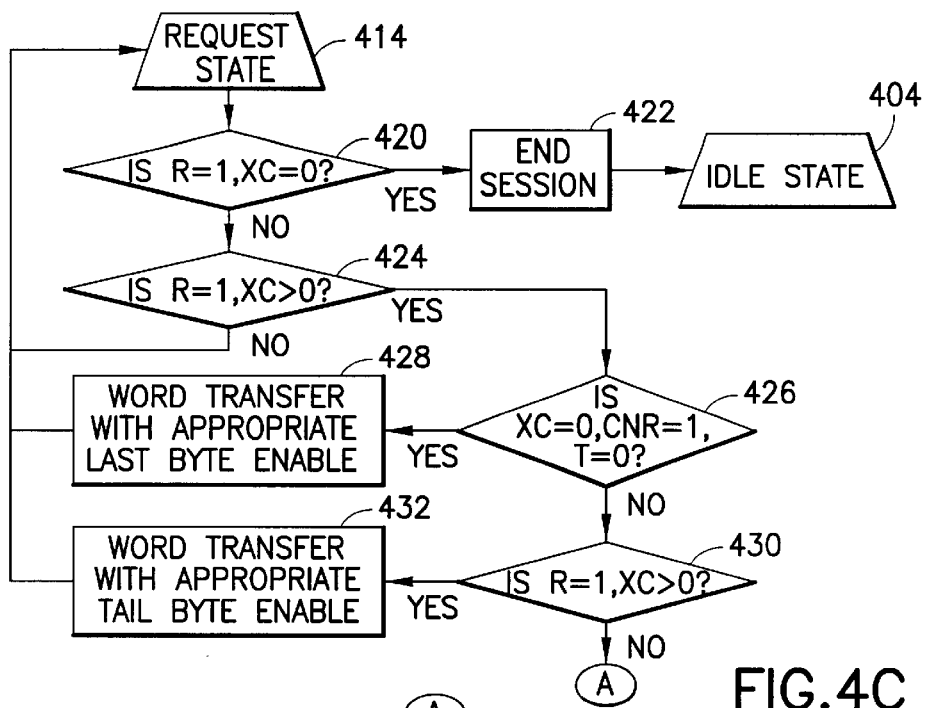

With reference to FIG. 4C, from step 414, processing continues at decision block 420. In decision block 420, a check is made to determine if R=1 and XC=0. If decision block 420 returns true (Yes), processing continues in step 422. In step 422, the current session is ended. Processing continues at step 404 and an idle state is entered.

Otherwise, if decision block 420 returns false (No), processing continues at decision block 424. In decision block 424, a check is made to determine if R=1 and XC>0. If decision block 424 returns false (No), processing continues at step 414. Otherwise, if decision block 424 returns true (Yes), processing continues at decision block 426.

In decision block 426, a check is made to determine if XC=0, CMR=1, and T=0. If decision block 426 returns true (Yes), processing continues in step 428. In step 428, a word transfer is carried out with the appropriate last byte enabled. Last byte enable is used to transfer the requested bytes of last word transaction on PLB. Processing then continues at step 414. Otherwise, if decision block 426 returns false (No), processing continues at decision block 430. In decision block 430, a check is made to determine if R=1 and XC>0. If decision block 430 returns true (Yes), processing continues at step 432. In step 432, a word transfer is carried out with appropriate tail byte enabled. In case of abnormal termination of a write transaction by the device, the last word transfer needs a byte enable. This is given as Tail Byte from the device. Processing then continues at step 414. Otherwise, if decision block 430 returns false (No), processing continues at decision block 434 of FIG. 4D.

Figure 4D:
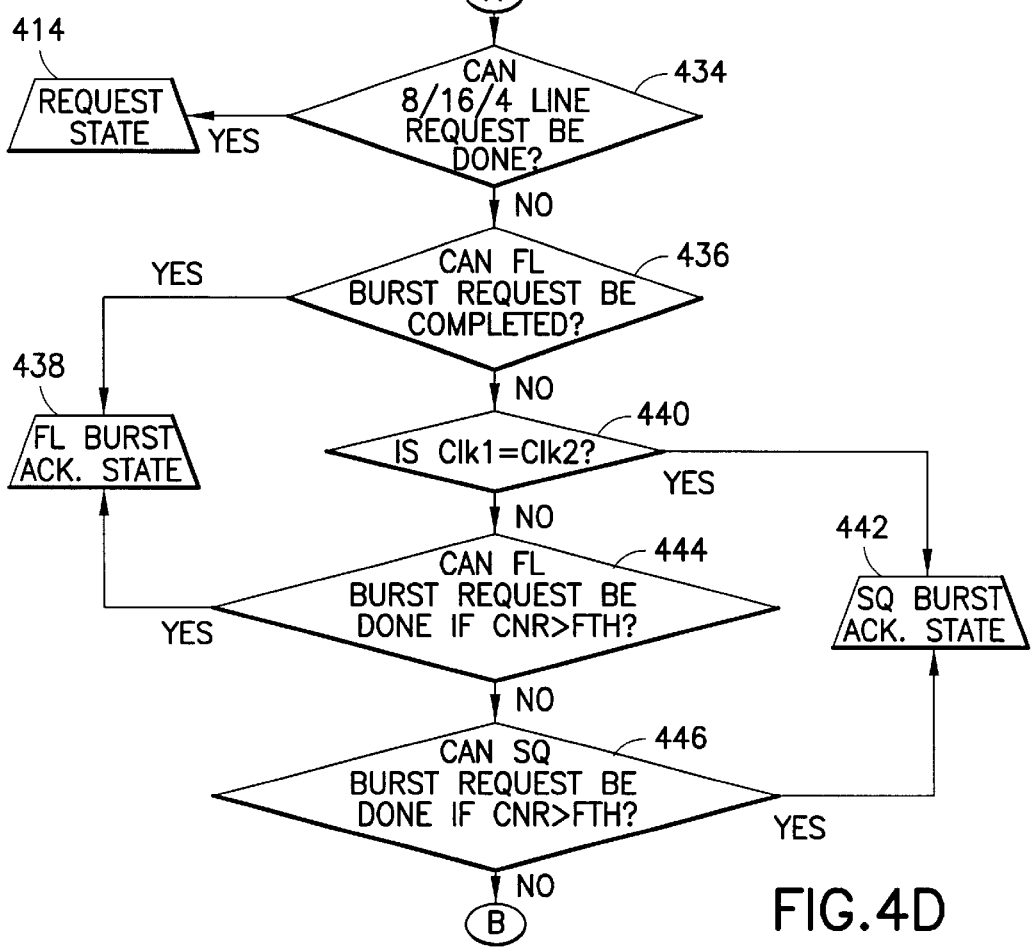

With reference to FIG. 4D, in decision block 434, a check is made to determine if an 8/16/4 line request can be done. The PLB supports 4-word, 8-word and 16-word line transfers. The decision selects one of these line transfers in this block. If decision block 434 returns true (Yes), processing continues at step 414. Otherwise, if decision block 434 returns false (No), processing continues at step 436. In decision block 436, a check is made to determine if a fixed length burst request can be completed. If decision block 436 returns true (Yes), processing continues at step 438. In step 438, a fixed length burst acknowledgment state is entered (see FIG. 4F).

Otherwise, if decision block 436 returns false (No), processing continues at step 440. In step 440, a check is made to determine if clock 1=clock 2 (Clk1=Clk2). If decision block 440 returns true (Yes), processing continues at step 442. In step 442, a sequential burst acknowledgment state is entered (see FIG. 4G).

If decision block 440 returns false (No), processing continues at decision block 444. In decision block 444, a check is made to determine if the fixed length burst request can be done if CNR>FTH. The condition checked in 444 is if the valid entries in the FIFO are greater than the FIFO threshold and a Fixed length burst request is possible. If decision block 444 returns true (Yes), processing continues at step 438. Otherwise, if decision block 444 returns false (No), processing continues at step 446. In decision block 446, a check is made to determine if the sequential burst request can be done if CNR>FTH. If decision block 446 returns true (Yes), processing continues at step 442 (see FIG. 4G). Otherwise, if decision block 446 returns false (No), processing continues at decision block 448 of FIG. 4E.

Figure 4E:
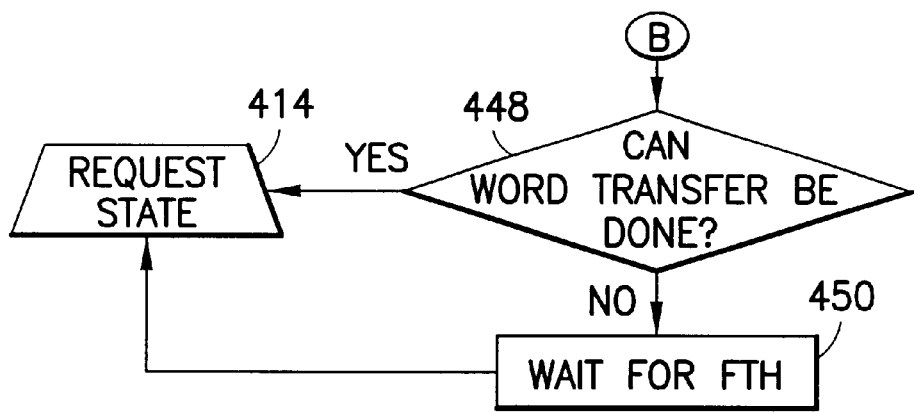

With reference to FIG. 4E, in decision block 448, a check is made to determine if a word transfer can be done. If decision block 448 returns true (Yes), processing continues at step 414. In step 414, the request state is entered. Otherwise, if decision block 448 returns false (No), processing continues at step 450. In step 450, a wait for FTH state is entered. To improve the overall performance, a request is not put on the PLB unless the number of entries in the FIFO is >=FIFO threshold. Processing then continues at request state step 414.

Figure 4F:
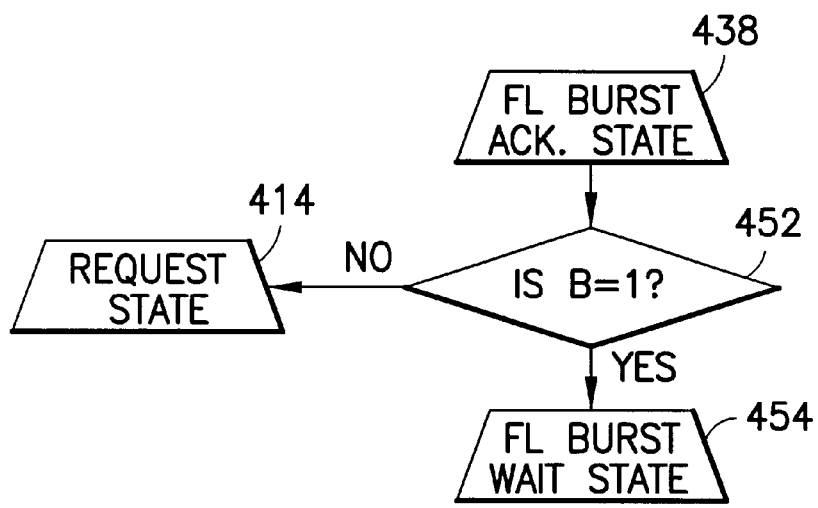

With reference to FIG. 4D, from step 438, processing continues at decision block 452 of FIG. 4F. In decision block 452, a check is made to determine if B=1. If decision block 452 returns false (No), processing continues at step 414 and a request state is entered. Otherwise, if decision block 452 returns true (Yes), processing continues at step 454. In step 454, a fixed length burst wait state is entered (see FIG. 4H).

Figure 4G:
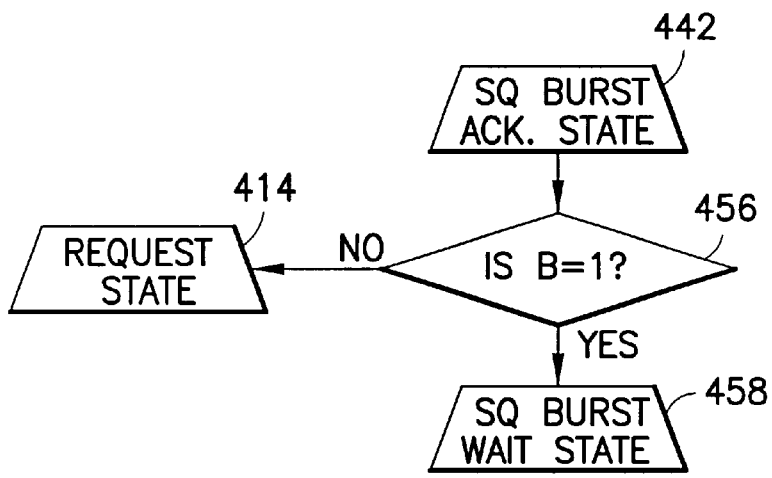

With reference to FIG. 4D, from step 442, processing continues at decision block 456 of FIG. 4G. In decision block 456, a check is made to determine if B=1. If decision block 456 returns false (No), processing continues at step 414 and a request state is entered. Otherwise, if decision block 456 returns true (Yes), processing continues at step 458. In step 458 a sequential burst wait state is entered (see FIG. 4D).

Figure 4H:
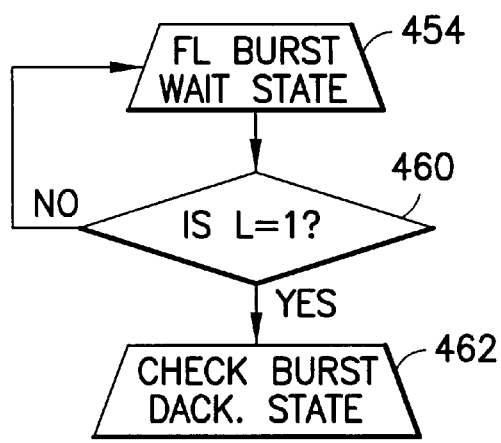

With reference to FIG. 4F, processing continues from step 454 to decision block 460 in FIG. 4H. In decision block 460, a check is made to determine if L=1. If decision block 460 returns false (No), processing continues at step 454. Otherwise, if decision block 460 returns true (Yes), processing continues at step 462. In step 462, a burst dack state is checked (see FIG. 4J). DACK stands for Data Acknowledgement. In the Check Burst dack State, the master waits for the confirmation that the last data transfer of the Burst transfer is over (WD=1). If this is so, then the Request State is entered. Otherwise the master remains in this state.

Figure 4I:
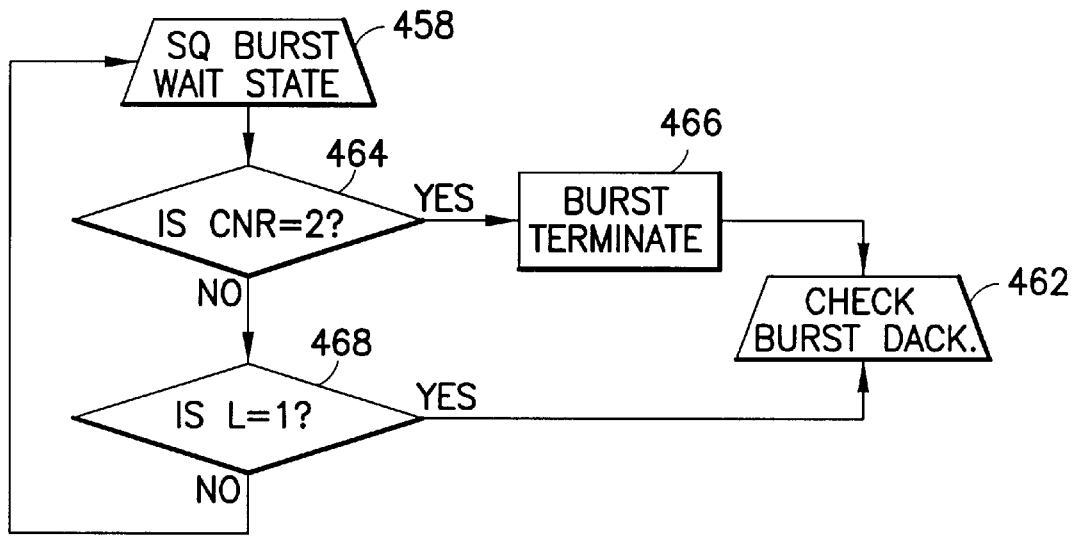

With reference to FIG. 4G, processing continues from step 458 to decision block 464 in FIG. 4I. In decision block 464, a check is made to determine if CNR=2. If decision block 464 returns true (Yes), processing continues in step 466. In step 466, the burst transfer is terminated. Processing then continues to step 462 in which a burst dack state is checked.

Otherwise, if decision block 464 returns false (No), processing continues in decision block 468. In decision block 468, a check is made to determine if L=1. If decision block 468 returns false (No), processing continues at step 458. Otherwise, if decision block 468 returns true (Yes), processing continues at step 462.

Figure 4J:
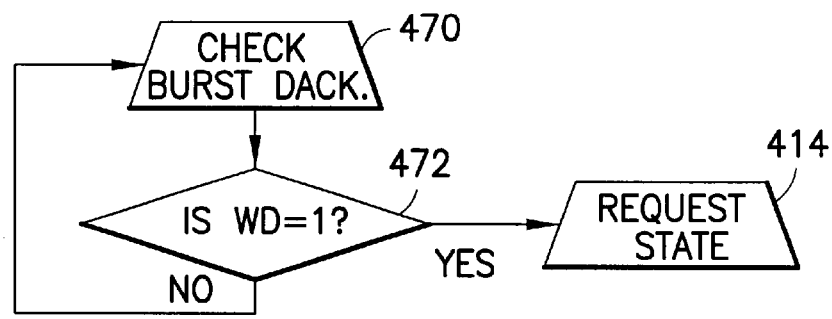

With reference to FIG. 4J, in step 470, a burst dack state is checked. Processing continues at decision block 472. In decision block 472, a check is made to determine if WD=1. If decision block 472 returns false (No), processing continues at step 470. Otherwise, if decision block 472 returns true (Yes), processing continues at step 414 and a request state is entered.

6. Results

Figure 5:
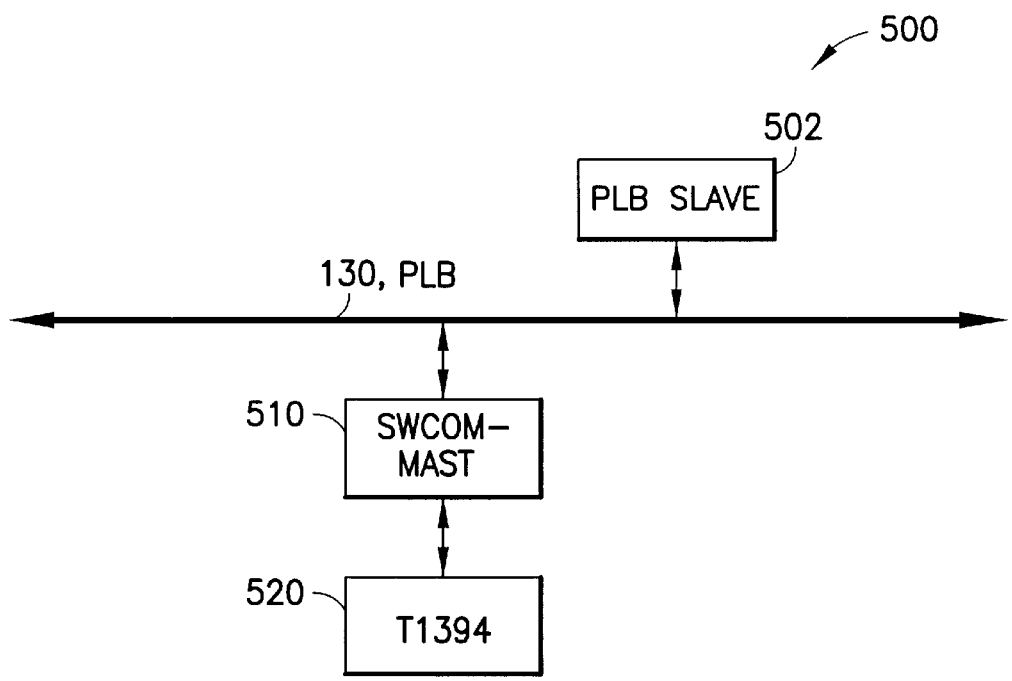
FIG. 5 is a block diagram of an existing implementation (shown here for comparison purposes only)
Figure 6:
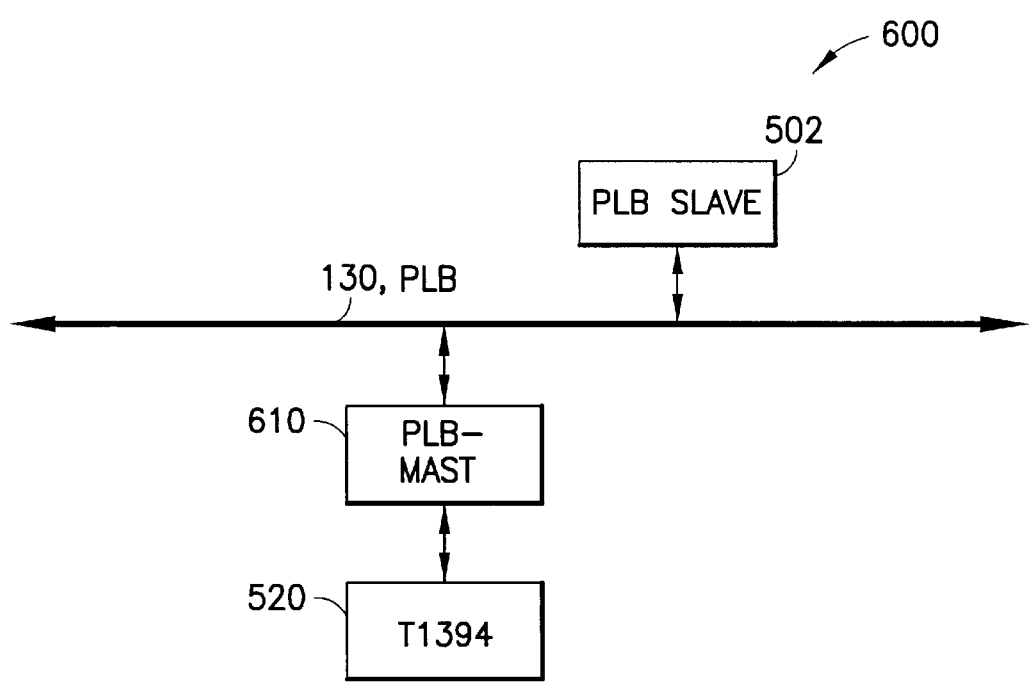
FIG. 6 is a block diagram of a simulation environment employing an embodiment of the invention.

The processes for read and write transfers of FIGS. 3 and 4 are implemented in the PLB master PLB-Mast 610 of FIG. 6 interfacing to a device T1394 asynchronously. PLB-Mast 610 is a 32 bit PLB master. The SWKOM_Mast 510 of FIG. 5 does not implement the embodiments of the invention and is shown for purposes of comparison with 610 only. In FIGS. 5 and 6, the systems 500, 600 each include a PLB slave 502 coupled to the PLB 130. Also each system includes the T1394 device 520. T1394 is a 1394*a* Link layer controller. In system 500, the SWKOM_Mast module 510 is coupled between the T1394 device 520 and the PLB 130. Similarly, in FIG. 6, the PLB_Mast module 610 is coupled between the T1394 device 520 and the PLB 130. The master module 610 of FIG. 6 implements an embodiment of the invention in accordance with FIG. 2, without the FIFO being shown in FIG. 6.

A 32 bit wide 16 deep FIFO was used in master 610 for data transfer for read and write at the asynchronous interface. The device 520 requested for a write or read transfer session on the PLB 130. Another PLB master SWKOM-Mast 510 of FIG. 5 interfaces with the same device T1394 520 asynchronously. SWKOM-Mast 510 is also a 32 bit PLB master. SWKOM-Mast 510 completes all transactions requested by the device 520. Since the device 520 used for the asynchronous interface is the same, the same test cases can be run in both environments and the simulation run times are tabulated in Table 5. Table 5 gives the result of simulation run times for a sample of test cases for both PLB-mast 610 and SWKOM-Mast 510. PLB Clock cycle time=10 ns.

TABLE 5

Comparison of Simulation Run Times

| Testcase | Simulation Run Time SWKOM-Mast (ns) | Simulation Run Time PLB-Mast (ns) | Number of PLB Clock Cycles Saved |
|---|---|---|---|
| Testcase1 | 1,323 | 683 | 64 |
| Testcase2 | 883 | 563 | 32 |
| Testcase3 | 663 | 343 | 32 |
| Testcase4 | 1,043 | 383 | 66 |
| Testcase5 | 7,743 | 7,343 | 40 |
| Testcase6 | 8,423 | 7,663 | 76 |
| Testcase7 | 36,503 | 13,963 | 2,254 |
| Testcase8 | 53,443 | 51,003 | 244 |
| Testcase9 | 30,843 | 27,043 | 380 |
| Testcase10 | 11,123 | 3,963 | 716 |

From Table 5, the processes of FIGS. 3 and 4 implemented in master 610 provide better performance than master 510 can, and bus utilization on the PLB 130 is better.

7. Computer-Based System

Components of the method for optimising a bus in a PLB system can be implemented as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The method steps for optimising a bus in a PLB system can be effected by instructions in the software. Again, the software may be implemented as one or more modules for implementing the method steps.

In particular, the software may be stored in a computer readable medium, including a storage device. A computer readable medium can store such software or program code recorded so that instructions of the software or the program code can be carried out. The processes of the embodiments can be resident as software or a computer readable program code recorded in the computer readable medium.

In the foregoing manner, a method, an apparatus and a computer program product for optimising a bus in a PLB system are disclosed. While only a small number of embodiments are described, it will be apparent to those skilled in the art in view of this disclosure that numerous changes and/or modifications can be made without departing from the scope and spirit of the invention.

We claim:

1. A method of optimising a bus in a Processor Local Bus (PLB) system, said method including the steps of:
   providing a master engine for performing a transfer transaction of N bytes of data on said bus of said PLB system;
   determining a type of transfer to be performed by said master engine to optimize operation of said bus of said PLB system in response to a transfer request received asynchronously from a device coupled to said bus; and
   transferring data asynchronously using a FIFO between said device and said bus of said PLB system dependent upon said determined type of transfer,
   wherein said determining step utilizes a request type determination function:
   Opt_req(t)=f(c1c2, S_FIFO, arb, thr_fifo)+g(wait_AAck, wait_DAck)+h(t, latmr, xfer_cnt, cnt_fifo, pend_req, pend_pri),
   where f( ) is a function of:
      c1c2=a clock frequency ratio between PLB clock c1 and device clock c2, S_FIFO=size of FIFO used for asynchronous interface, arb=PLB arbitration type, single or two cycle, thr_fifo=threshold of FIFO;
   g( ) is a function of stave address acknowledgment wait state wait_AAck and slave data acknowledgment wait state wait_Dack; and
   h( ) is a function of:
      t=time,
      latmr=PLB master's latency timer count value at time t,
      xfer_cnt=number of data transfers remaining at time t, to complete the device requested. number of transfers,
      cnt_fifo=occupancy of FTFO at time t,
      pend_req=pending request at time t, and
      pend_pri=pending request priority at time t.

2. A method of optimising a bus in a Processor Local Bus (PLB) system, said method including the steps of:
   providing a master engine for performing a transfer transaction of N bytes of data on said bus of said PLB system;
   determining a type of transfer to be performed by said master engine to optimize operation of said bus of said PLB system in response to a transfer request received asynchronously from a device coupled to said bus;
   transferring data asynchronously using a FIFO between said device and said bus of said PLB system dependent upon said determined type of transfer; and
   generating a transfer request,
   wherein said generating step includes the steps of:
      checking a transfer count indicating the number of transfers remaining;
      checking a fifo count indicating the number of entries in said FIFO occupied by valid data;
      determining the next request type from the group consisting of word, sequential burst, fixed length burst and line transfer based on said transfer count and fifo count checks; and
      sending said transfer request.

3. The method according to claim 2, wherein said transfer request is for a read or write data transfer.

4. The method according to claim 2, further including the steps of:
  once said transfer request is sent, putting said next request on said bus of said PLB system; and
  based on a previous request type and said transfer count, determining a request type.

5. An apparatus for optimising a bus in a Processor Local Bus (PLB) system, said apparatus including:
  a master engine for performing a transfer transaction of N bytes of data on said bus of said PLB system;
  means for determining a type of transfer to be performed by said master engine to optimize operation of said bus of said PLB system in response to a transfer request received asynchronously from a device coupled to said bus; and
  a FIFO coupled to said master engine for transferring data asyncbronously between a device and said bus of said PLB system dependent upon said determined type of transfer;
  wherein said determining means utilizes a request type determination function:
    Opt_req(t)=f(c1c2, S_FIFO, arb, thr_fifo)+g(wait_AAck, wait_DAck)+h(t, latmr, xfer_cnt, cnt_fifo, pend_req, pend_pri),
  where f( ) is a function of:
    c1c2=a clock frequency ratio between PLB clock c1 and device clock c2,
    S_FIFO=size of FIFO used for asynchronous interface,
    arb=PLB arbitration type, single or two cycle,
    tbr_fifo=threshold of FIFO;
  g( ) is a function of slave address acknowledgment wait state wait_AAck and slave data acknowledgment wait state wait_Dack; and
  h( ) is a function of:
    t=time,
    latmr=PLB master's latency timer count value at time t,
    xfer_cnt=number of data transfers remaining at time t, to complete the device requested number of transfers,
    cnt_fifo=occupancy of FIFO at time t,
    pend_req=pending request at time t; and
    pend_pri=pending request priority at time t.

6. An apparatus for optimising a bus in a Processor Local Bus (PLB) system, said apparatus including:
  a master engine for performing a transfer transaction of N bytes of data on said bus of said PLB system;
  means for determining a type of transfer to be performed by said master engine to optimize operation of said bus of said PLB system in response to a transfer request received asynchronously from a device coupled to said bus;
  a FIFO coupled to said master engine for transferring data asynchronously between a device and said bus of said PLB system dependent upon said determined type of transfer; and
  generating a transfer request;
  wherein said generating means includes:
    means for checking a transfer count indicating the number of transfers remaining;
    means for checking a fifo count indicating the number of entries in said FIFO occupied by valid data;
    means for determining the next request type from the group consisting of word, sequential burst, fixed length burst and line transfer based on said transfer count and fifo count checks; and
    means for sending said transfer request.

7. The apparatus according to claim 6, wherein said transfer request is for a read or write data transfer.

8. The apparatus according to claim 6, further including:
  means for, once said transfer request is sent, putting said next request on said bus of said PLB system; and
  means for, based on a previous request type and said transfer count, determining a request type.

9. A computer program product having a computer readable medium having a computer program recorded therein for optimising a bus in a Processor Local Bus (PLB) system, said apparatus including:
  computer program code means for providing a master engine for performing a transfer transaction of N bytes of data on said bus of said PLB system;
  computer program code means for determining a type of transfer to be performed by said master engine to optimize operation of said bus of said PLB system in response to a transfer request received asynchronously from a device coupled to said bus;
  computer program code means for transferring data asynchronously using a FIFO between said device and said bus of said PLB system dependent upon said determined type of transfer;
  wherein said computer program code means for determining utilizes a request type determination function:
    Opt_req(t)=f(c1c2, S_FIFO, arb, thr_fifo)+g(wait_AAck, wait_DAck)+h(t, latmr, xfer_cnt cnt_fifo, pend_req, pend_pri),
  where f( ) is a function of:
    c1c2=a clock frequency ratio between PLB clock c1 and device clock c2,
    S_FIFO=size of FIFO used for asynchronous interface,
    arb=PLB arbitration type, single or two cycle,
    thr_fifo=threshold of FIFO;
  g( ) is a function of slave address acknowledgment wait state wait_AAck and slave data acknowledgment wait state wait_Dack; and
  h( ) is a function of:
    t=time,
    latmr=PLB master's latency timer count value at time t,
    xfer_cnt=number of data transfers remaining at time t, to complete the device requested number of transfers
    cnt_fifo=occupancy of FIFO at time t,
    pend_req=pending request at time t, and
    pend_pri=pending request priority at time t.

10. A computer program product having a computer readable medium having a computer program recorded therein for optimising a bus in a Processor Local Bus (PLB) system, said apparatus including:
  computer program code means for providing a master engine for performing a transfer transaction of N bytes of data on said bus of said PLB system;
  computer program code means for determining a type of transfer to be performed by said master engine to optimize operation of said bus of said PLB system in response to a transfer request received asynchronously from a device coupled to said bus;
  computer program code means for transferring data asynchronously using a FIFO between said device and said bus of said PLB system dependent upon said determined type of transfer; and computer program code means for generating a transfer request, wherein said computer program code means for generating includes:

computer program code means for checking a transfer count indicating the number of transfers remaining;

computer program code means for checking a fifo count indicating the number of entries in said FIFO occupied by valid data;

computer program code means for determining the next request type from the group consisting of word, sequential burst, fixed length burst and line transfer based on said transfer count and fifo count checks; and computer program code means for sending said transfer request.

11. The computer program product according to claim 10, wherein said transfer request is for a read or write data transfer.

12. The computer program product according to claim 10, further including:

computer program code means for, once said transfer request is sent, putting said next request on said bus of said PLB system; and computer program code means for, based on a previous request type and said transfer count, determining a request type.

* * * * *